United States Patent [19]
Treants
[11] Patent Number: 4,593,789
[45] Date of Patent: Jun. 10, 1986

[54] TREE CLIMBING APPARATUS

[76] Inventor: Bill Treants, 5329 S. Skyline Dr., New Berlin, Wis. 53151

[21] Appl. No.: 784,952
[22] Filed: Oct. 7, 1985
[51] Int. Cl.⁴ ........................ A01M 31/02; A45F 3/26; A47C 9/10
[52] U.S. Cl. .................................... 182/142; 182/134; 182/187; 105/152
[58] Field of Search ............... 182/187, 188, 142, 134, 182/133, 135, 136; 108/152

[56] References Cited

U.S. PATENT DOCUMENTS

| | | | |
|---|---|---|---|
| 3,352,379 | 11/1967 | Riggs | 182/20 |
| 3,460,649 | 8/1969 | Baker | 182/187 |
| 3,520,383 | 7/1970 | Look | 182/187 |
| 3,568,797 | 3/1971 | Hardy | 182/187 |
| 3,727,723 | 4/1973 | Pitcairn et al. | 182/133 |
| 3,731,762 | 5/1973 | Sirls | 182/142 |
| 3,990,537 | 11/1976 | Swenson | 182/187 |
| 4,008,785 | 2/1977 | Mugnaini | 182/133 |
| 4,022,292 | 5/1977 | Gompel | 182/187 |
| 4,244,445 | 1/1981 | Strode | 182/187 |
| 4,321,982 | 3/1982 | Strickland | 182/134 |
| 4,321,983 | 3/1982 | Nelson | 182/187 |
| 4,347,913 | 9/1982 | Cromer, Jr. | 182/142 |
| 4,493,395 | 1/1985 | Rittenhouse | 182/187 |

OTHER PUBLICATIONS

Brochure of Woods and Water, Inc. entitled "Quick & Quiet" (undated and consisting of 4 pages).

*Primary Examiner*—Reinaldo P. Machado
*Attorney, Agent, or Firm*—Quarles & Brady

[57] ABSTRACT

A tree or the like climbing platform wherein a platform is raised or lowered over a tree trunk by a supporting member extending from the platform to surround the tree at the opposite side of the platform. Guide rollers extend from the supporting member and the platform for contacting the tree trunk. There is provided a tree trunk engaging plate extending from the platform which is in biased engagement with the tree trunk for holding penetration. The engaging plate is released from engagement by a foot pedal which is interconnected with the plate. The climbing apparatus also includes an adjustable strap connected to the platform and surrounds the tree trunk on the same side as the supporting member. It is adjustable so that the platform will remain level irrespective of the taper or diameter of the tree. The versatility of this climbing apparatus is seen in the fact that it can be raised or lowered by various devices including a winch.

11 Claims, 4 Drawing Figures

50
21
20
17
16
48
24
23
30
29
31
27
26
25
40
32
39
14
13
11
21
44
36
62
61
63
34
34
33

49
31
51
52
52
53
52
47

54
55
11
45
60
45

TREE CLIMBING APPARATUS

BACKGROUND OF THE INVENTION

This invention relates to a tree climbing apparatus or the like which can provide a smooth and safe ascending and descending operation. More particularly, this invention relates to an apparatus of the foregoing type having a tree engaging member which is biased for automatic engagement with the tree yet can be released from engagement as well as a strap member which is adjustable to surround the tree to provide a leveling of the platform irrespective of the tree diameter.

U.S. Pat. Nos. 4,321,982 and 4,321,983 provide tree climbing platform devices wherein gripping portions can be moved upwardly along the tree by the climber so as to elevate the platform. In U.S. Pat. No. 4,321,982 a v-type member 14 engages a tree at one side and spikes 24 extend from a platform frame member 13 to engage opposing sides of the tree. A chain 26 also engages the tree and is retained by a tensioning spring 28. The U.S. Pat. No. 4,321,983 patent is directed to a particular frame structure for a climbing apparatus which utilizes a wedging engagement by a support 7 and a foot support 43. There is also available in the market place a tree stand from Woods and Water, Inc. in Milwaukee, Wisconsin, which utilizes a standing type platform with opposing and tree engaging members of the penetrating type. This particular unit is utilized to climb a tree in a bear hug like fashion. The tree stand is lifted by the climber's feet and is raised and lowered by a rocker like motion between the engaging members.

The prior art does not provide a tree climbing apparatus which during ascending or descending a tree or the like can provide a smooth engagement with the tree surface yet at the same time afford a safety mechanism which can be released for descent. Neither does the prior art afford a tree climbing apparatus of the foregoing type wherein the platform can be adjusted in conjunction with the diameter or taper of the tree.

It is an advantage of the present invention to provide a tree climbing apparatus which is easy to operate and can be done so in a safe manner. Another advantage is a platform device which can be raised and lowered over a tree surface in a smooth manner to provide a smooth ride up and down the tree. Yet another advantage of this invention is a climbing apparatus of the foregoing type wherein the platform can be maintained in a level manner irrespective of the diameter or taper of the tree. Still another advantage of the apparatus of this invention is in affording a raising or lowering type platform which is susceptible to a variety of means of raising or lowering the platform over the tree. Yet another advantage of the apparatus is in affording a unit which can be readily constructed from available parts and without special tooling, thus providing a unit which is relatively low in cost.

SUMMARY OF THE INVENTION

The foregoing advantages are accomplished and the shortcomings of the prior art are overcome by the tree climbing apparatus of this invention which has a platform adapted to be raised or lowered over a tree trunk. A supporting member extends from the platform which surrounds the tree trunk at a side opposite the platform. Guide roller means are attached to the supporting member and extend from the platform for contacting the tree trunk at opposite sides. Tree trunk engaging means extend from the platform for penetrating the tree trunk and are biased to urge tree trunk engaging means to penetrate the tree trunk. Means are also provided to release the biasing means for descending the tree. In addition, there are provided adjustable strap means operatively connected to the platform and surrounding the tree trunk on the same side as the supporting member so as to provide a leveling of the platform irrespective of the diameter or taper of the tree. The preferred manner to release the biasing of the tree trunk engaging means includes a foot operated pedal. The biasing means is provided by a stretch cord connected to the tree trunk engaging means and acted upon by the foot operated pedal. The tree trunk engaging means is provided by a locking bar having sharpened edges. In a preferred manner, a frame member extends from the opposing sides of the platform to provide a hand railing on one side and support for wheels to transport the apparatus at the other. If desired, a winch can be connected to the frame member for ease of raising the platform or lowering it over the tree.

BRIEF DESCRIPTION OF THE DRAWINGS

A better understanding of the present tree climbing apparatus can be accomplished by reference to the drawings wherein.

DESCRIPTION OF THE PREFERRED EMBODIMENT

Figure 1:
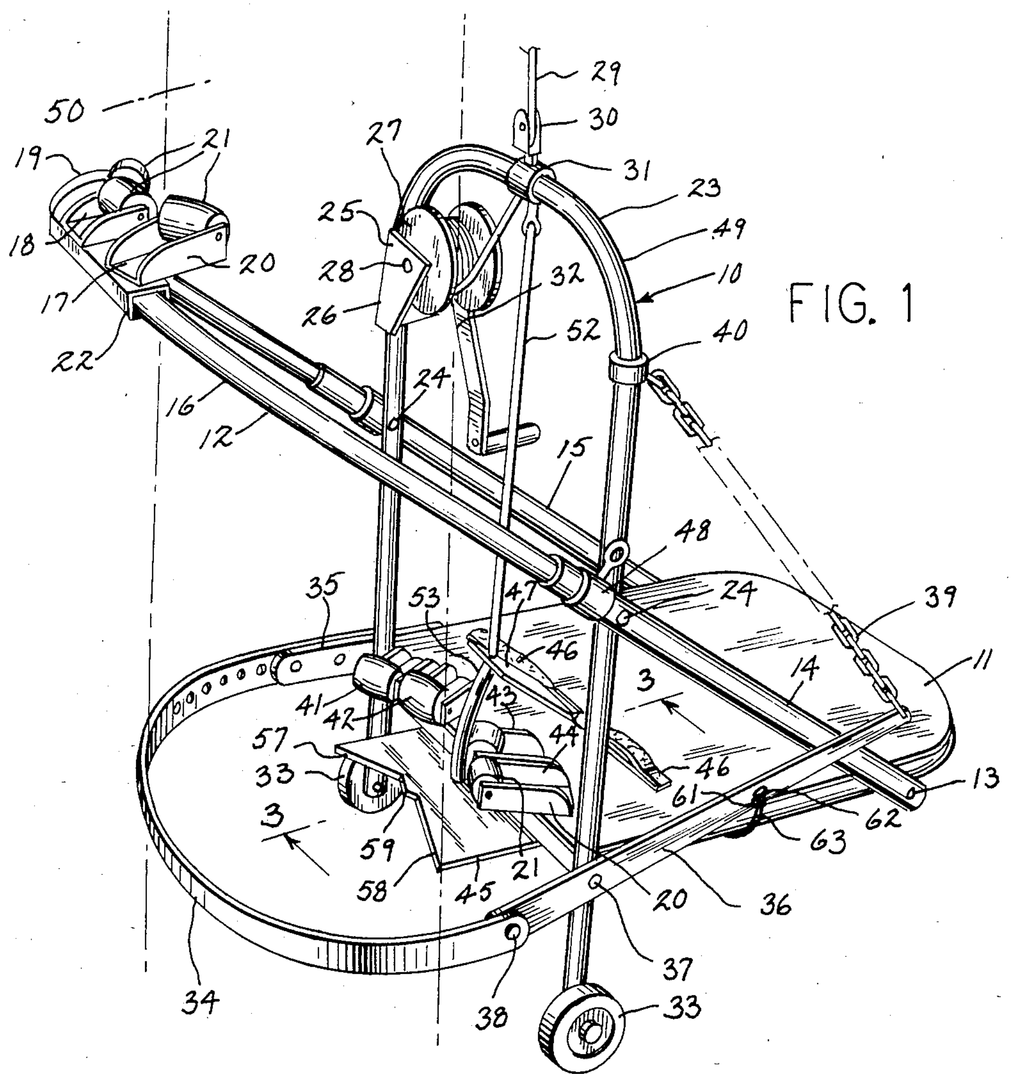
FIG. 1 is a perspective view of the tree stand of this invention.

The tree stand or climbing apparatus generally is shown in FIG. 1. It has a platform member 11 which is attached in a pivotal manner such as by the pivotal connectors 13 to diagonally extending support member 12 by the arm portions 14 and 15. A telescoping arm portion 16 of a generally U-shape extends and is slideably received in the tubular arm portions 14 and 15. The guide roller members 17, 18 and 19 are connected to the telescoping arm portion 16. These have U-shaped brackets 20 for supporting the rollers 21 by means of the usual axles. The U-shaped brackets 20 are secured to the common bracket 22 which in turn is attached to telescoping arm portion 16.

Extending upwardly from the platform 11 and attached thereto in a pivotal manner such as with a connector 37 is a U-shaped support member 23. It is also pivotally attached to the arm members 14 and 15 such as at the pivot points 24. A winch 25 having the usual spaced apart support plates 26 are attached to arm portion of the U-shaped support part 23 which serves as a hand railing. The winch 25 has the usual spool 27 supported between the support plates 26 such as by the shaft 28. A rope 29 is wound on the spool 22 and extends upwardly from the U-shaped support 23. It is guided by the pulley 30 connected to the U-shaped support 23 by the collar 31. The handle 32 is also pivotally supported on the support plate 26 (see FIG. 4). A rotatable connection is made with the usual drive gear 56 for moving or rotating the spool 27. At the opposite end of the U-shaped support 23 are a pair of wheels 33 for transporting the tree stand 10 to the desired location of use.

Also pivotally attached to the U-shaped support 23 is a strap 34 attached to one arm of the support 23 by an additional strap 35 at one side. The opposing side of the strap 34 is connected to a pivotal bar 36 such as by the connector 38. The pivoting of the bar 36 is afforded through the pivotal connection 37. The bar 36 is in turn attached to a chain 39 at one end. Chain 39 is secured at the opposing end to the U-shaped bracket 23 such as by means of the collar 40. A hook 61 engages an aperture 62 in the bar 36 and is attached to an elastic cord 63 which is suitably secured to the platform 11.

Extending outwardly from the platform 11 are four roller members 41, 42, 43 and 44 which have rollers 21 positioned in an arcuate manner for engagement with the outer circumference of the tree 50. These rollers are essentially the same as those described previously in conjunction with rollers 17–19. Extending outwardly in a pivotal manner from the bottom of the platform 11 is a locking bar plate 45. It has inwardly sloping walls such as 57 and 58 as well as a central tree engaging projecting portion 59. Secured to the platform is a pair of footstraps 46 with peddleplate 47 interposed therebetween (see FIG. 4). Peddleplate 47 and locking bar 45 have a spacing member 53 positioned therebetween through which extends an elastic cord 52 (see FIG. 3). Cord 52 is secured at the upper end to the collar 31.

Figure 3:
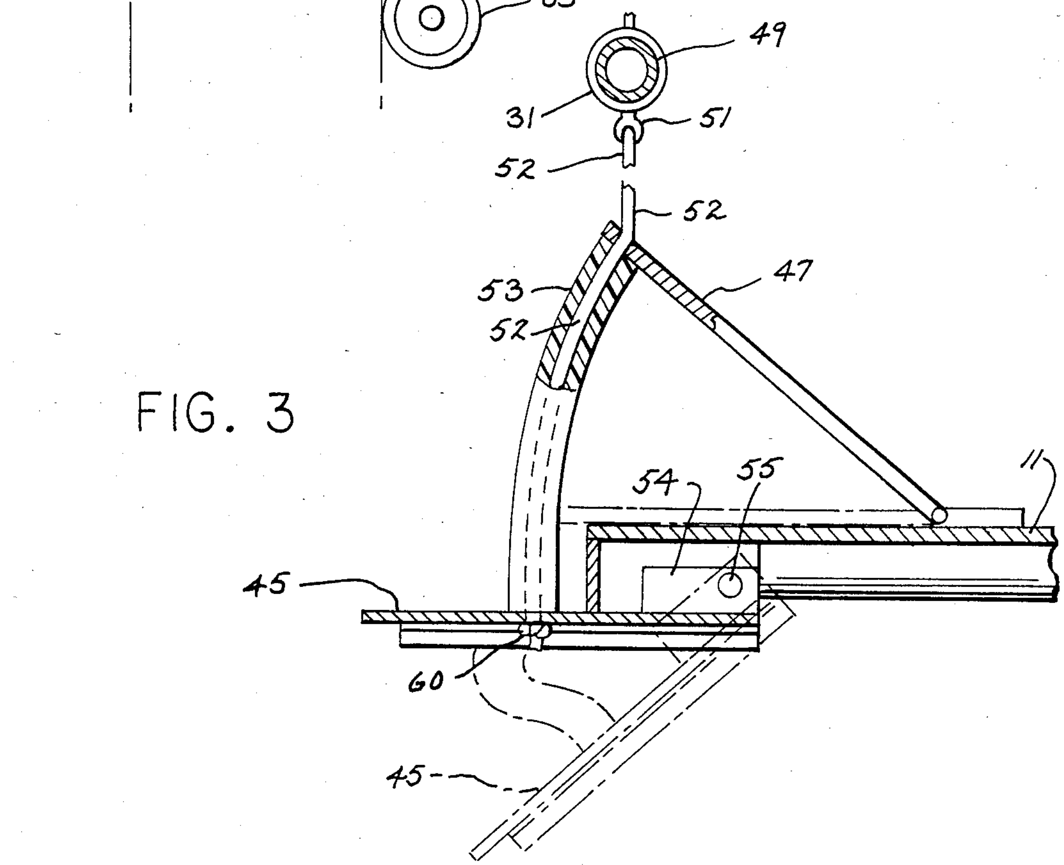
FIG. 3 is a view in vertical section taken along line 3—3 of FIG. 1.

Referring specifically to FIG. 3, the attachment of the elastic cord 52 is illustrated. The cord is secured under the locking bar 45 by the knot 60. It will be seen that the spacer 53 is of a tubular construction with the elastic cord 52 extending therethrough. Likewise, the peddleplate 47 has an opening for receiving the cord 52. The locking bar 45 is pivotally attached to the underside of the platform 11 by means of flange plate 54 through which extends shaft 55. In this instance two such flange plates 54 with the shafts 55 will be utilized for the pivotal attachment with two additional flange plates attached to platform 11.

The advantages of the tree stand 10 will be appreciated by a description of its Operation as follows:

OPERATION

Figure 4:
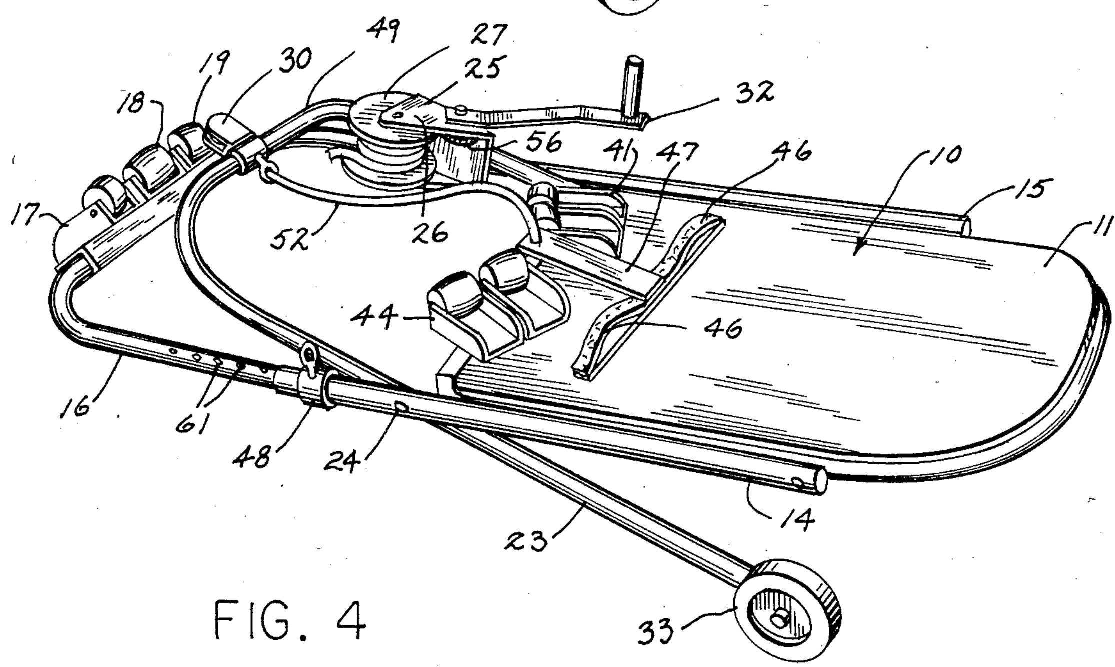
FIG. 4 is a top perspective view of the tree stand of FIG. 1 in a collapsed condition.

Turning first to FIG. 4 it will be seen that the tree stand 10 is easily collapsed such as through the pivotal connection indicated by the numeral 24. It should be pointed out that in this instance the numeral 24 is actually an aperture with the pivotal connection being made between arms 14 and 15 and support member 23 to the inside of the tubular arm portions 14 and 15. This will afford telescoping of the telescoping arm portion 16 within the tubular arm members 14 and 15. Wheels 33 will afford suitable transportation of the tree stand to the appropriate site. When the appropriate tree trunk 50 is selected, the tree stand is readily placed around the tree trunk 50 such as by disengagement of telescoping arm portion 16 and positioning it around the tree from the opposing side which will be contacted by the rollers 21 of the roller members 41–44 extending from the platform 11. In this instance the rollers 21 of the roller members 17–19 will engage the opposite side of the tree. Suitable adjustment to accommodate the diameter of the tree will be afforded by movement of the telescoping arm portion 16 into the tubular arm portions 14. An adjustable fastening is made by the apertures 61 and the connector 48 in the usual manner. In this position it will be appreciated that locking bar 45 will automatically engage the tree with the projection 59 slightly embedded therein. Assuming that the tree has a suitable support limb, the rope 29 will then be placed over the limb and tied to the bottom of the tree in the usual manner. This will afford the use of the winch 25 to move the platform upwardly with the rider suitably supported on the platform 11. Alternatively, a strap member could be placed around the tree at a maximum height which can be reached from the tree stand 11. The rope 29 would then be tied thereto and the winch utilized to move the platform upwardly to the maximum extent. Thereafter the strap would again be moved upwardly. In the event that the tree is not suitable for use with the winch as previously indicated, the operator has the option of moving the tree stand upwardly with the usual straps 46 which will be engaged by the feet. The operator then places a strap around the tree and pulls the platform upwardly by the foot straps. This is a usual procedure in conjunction with raising tree stands.

Figure 2:
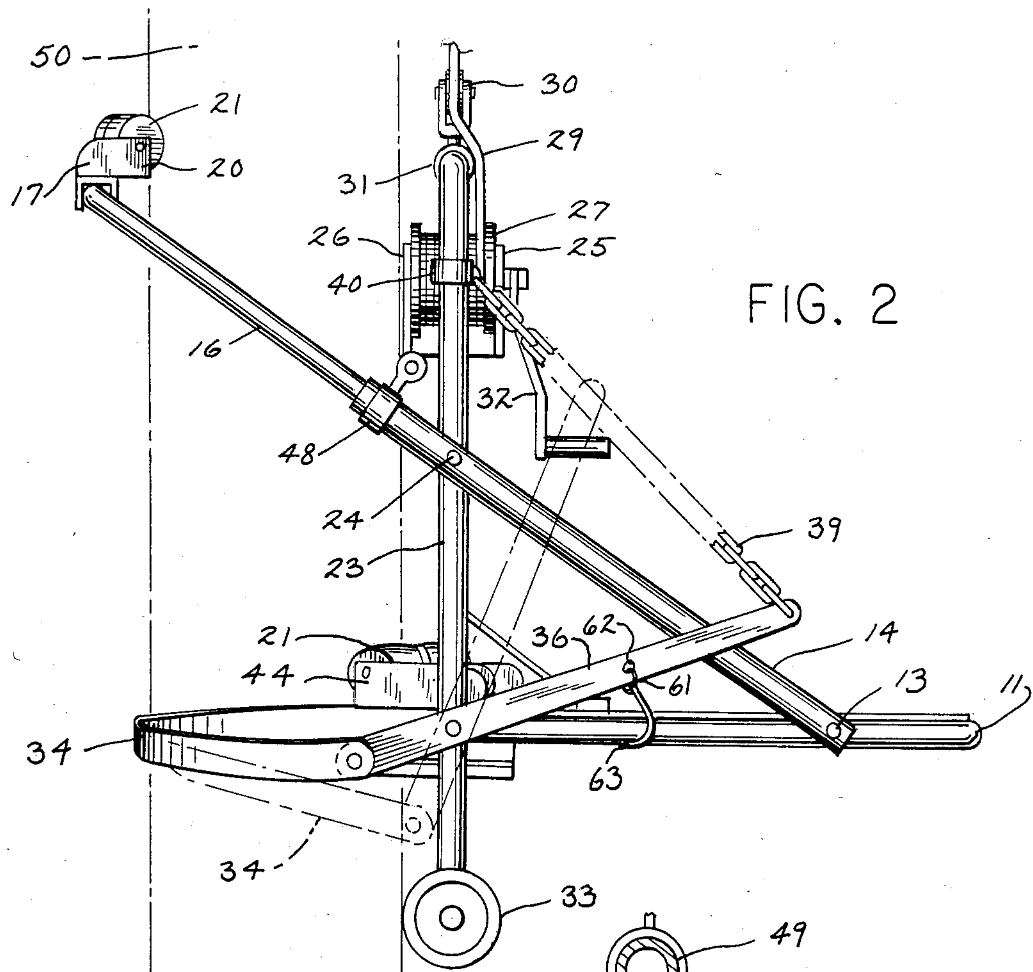
FIG. 2 is a view and in side elevation showing the tree stand as it would be utilized in conjunction with a tree which is shown in phantom lines.

When a suitable height is reached, the strap 34 will engage the tree to stablize the tree stand as an additional support member. It should be further appreciated that as one ascends the tree the diameter of the tree becomes smaller. The tree stand of this invention compensates for this variance in diameter in that movement of the bar 36 upwardly by the chain 39 will cause the strap 34 to move downwardly and to become shortened with respect to the circumference of the tree. This is specifically shown in FIG. 2. The strap 34 will be held in a biased manner by the elastic cord 63 and the hook 61. It is this adjustment which will permit the platform 11 to be at level position irrespective of the tree diameter.

When it is desired to descend the tree, the safety feature of this invention as shown in FIG. 3 is employed in the same manner as the tree stand is utilized to ascend the tree. The locking plate 35 will at all times engage the tree. This is effected by the cord 52 at all times exerting an upward force on the locking plate 45. When it is desired to descend the tree, the locking plate will be moved to disengage the tree. This is easily afforded by depressing the peddleplate 47 through the spacing member 53. This will cause the bar plate 45 to angle downwardly and away from the tree as shown in FIG. 3. The displacement is in part effected through the stretching of the elastic cord 52. It should be appreciated that a safety factor is built into the use of the tree stand during descent in that at any time the operator's feet will leave the peddle 47, the bar plate 45 will again engage the tree to stop the descent. This is an important feature of the tree stand of this invention. It will be obvious to those skilled in this particular art that any suitable means of lowering the stand can be utilized. This could be with the rope 28 from the winch 25 or by holding onto the tree when the rope is not employed with the footpeddle 47 depressed.

In the foregoing description, various types of pivotal connectors such as 13, 24 and 37 have been indicated for attaching the various members of the stand. Obviously, any suitable connector means such as wing nuts and bolts can be utilized. While guide roller members 17–19 and 41–44 have been illustrated, these can be eliminated and still have the level adjustment strap feature and the safety feature with the pivotal bar plate 45 and the peddle 47. Obviously, if one were to utilize the winch only to raise or lower the stand, the foot straps 46 would not need be employed.

It will thus be seen through the present invention there is now provided a tree stand member which employs various improved features for climbing a tree. These are accomplished in a unit which is readily constructed from readily available component parts. The tree stand is adaptable to different types of raising and lowering mechanisms yet is readily collapsed for ease of transportation. Rollers are provided as an optional feature to allow a smooth ride while ascending or descending the tree.

I claim:

1. A tree or the like climbing apparatus comprising:

a platform adapted to be raised or lowered over a tree trunk or the like;

a supporting member extending from said platform for surrounding said tree trunk at a side opposite said platform;

tree trunk engaging means extending from said platform for penetrating said tree trunk;

biasing means operatively associated with said tree trunk engaging means to urge said tree trunk engaging means to penetrate said tree trunk;

means to release said biasing means; and adjustable strap means operatively connected to said platform and surrounding said tree trunk on the same side as said supporting member.

2. The apparatus of claim 1 wherein said means to release said biasing means includes a foot operated pedal.

3. The apparatus of claim 2 wherein said biasing means is defined by a stretch cord secured to said tree trunk engaging means and said foot operated pedal is constructed and arranged to stretch said cord and provide in part the means to release the biasing means.

4. The apparatus of claim 1 wherein guide rollers extend from said platform to contact said tree trunk.

5. The apparatus of claim 3 wherein said tree trunk engaging means is defined by a pivotal plate member having a sharpened edge.

6. The apparatus of claim 1 further including means to effect variable tension on said adjustable strap means.

7. The apparatus of claim 1 further includes a frame member extending from opposing sides of said platform to provide a hand railing.

8. The apparatus of claim 7 further including wheels rotatably attached to said frame member at a position opposite said hand railing.

9. The apparatus of claim 1 wherein said supporting member extending from said platform for surrounding said tree trunk opposite said platform includes roller members for engagement with said tree trunk.

10. The apparatus of claim 9 wherein said supporting member is defined by telescoping tubular members having an apertured adjustment.

11. The apparatus of claim 7 further including a winch connected to said frame member.

* * * * *